United States Patent [19]

Koide et al.

[11] Patent Number: 5,229,745

[45] Date of Patent: Jul. 20, 1993

[54] OIL PRESSURE ALARM DEVICE FOR MOTOR VEHICLE

[75] Inventors: Masayuki Koide, Shizuoka; Takafumi Ichikawa, Aichi, both of Japan

[73] Assignees: Kabushiki Kaisha Tokai Rika Denki Seisakusho, Aichi; Suzuki Motor Corporation, Shizuoka, both of Japan

[21] Appl. No.: 763,586

[22] Filed: Sep. 23, 1991

[30] Foreign Application Priority Data

Sep. 27, 1990 [JP] Japan ................... 2-258421

[51] Int. Cl.$^5$ .................................... B60Q 1/00
[52] U.S. Cl. .................................... 340/451; 340/438; 340/461; 340/626
[58] Field of Search ............ 340/451, 459, 438, 626, 340/461

[56] References Cited

U.S. PATENT DOCUMENTS

| | | | |
|---|---|---|---|
| 2,728,903 | 12/1955 | Myers | 340/451 |
| 3,119,991 | 1/1964 | Nallinger | 340/626 |
| 3,866,166 | 2/1975 | Kerecher | 340/462 |
| 3,906,440 | 9/1975 | Haupt | 340/438 |
| 3,927,390 | 12/1975 | Hill | 340/451 |
| 4,021,794 | 5/1977 | Carlson | 340/451 |
| 4,984,543 | 1/1991 | Tharman | 340/451 |
| 5,107,248 | 4/1992 | Koiwa et al. | 340/451 |

*Primary Examiner*—Jin F. Ng
*Assistant Examiner*—Nina Tong
*Attorney, Agent, or Firm*—Finnegan, Henderson, Farabow, Garrett & Dunner

[57] ABSTRACT

An oil pressure alarm device for a motor vehicle comprises, an oil pressure switch, the oil pressure switch being activated to a conductive state when the circulation oil pressure of engine oil decreases below a predetermined level, alarm device for forming first current path in response to a conductive and non-conductive operation of the oil pressure switch after main power switch is turned on, condition detecting device for producing a detection signal in response to rotation of the engine, delay device for producing an enabling signal after a predetermined time of period has elapsed from when the detection signal is supplied from the condition detecting device, and alarm control device for forming second current path for the alarm device when the oil pressure switch is turned on under the condition that the enabling signal is outputted by the delay device, and for maintaining the second current path while the enabling signal is supplied from the delay device to the warning control circuit.

3 Claims, 6 Drawing Sheets

OIL PRESSURE ALARM DEVICE FOR MOTOR VEHICLE

BACKGROUND OF THE INVENTION

This invention relates to an oil pressure alarm device in a motor vehicle which gives a warning when the circulation pressure of the engine oil is decreased.

In a conventional oil pressure alarm device of this type, as shown in FIG. 6, an oil pressure switch 1 is connected through a series circuit of alarm means, namely, a warning lamp 2 and an ignition switch 3 to a vehicle battery 4. When the circulation pressure of the engine oil is decreased to a predetermined value with the ignition switch 3 held turned on, the warning switch 1 is turned on to turn on the warning lamp 2. Normally, when the engine has been started, the circulation pressure is higher than the predetermined value, and therefore the warning lamp 1 is not turned on. However, when the engine oil circulation pressure is decreased for instance when the engine oil is decreased in quantity, the oil pressure switch 2 is turned on, as a result of which the warning lamp 2 is turned on to notify the operator of the decrease of the engine oil circulation pressure.

In practice, the circulation pressure of the engine oil depends on the operating condition of the engine. Hence, the above-described conventional oil pressure alarm device suffers from the following difficulties: That is, when the circulation pressure changes across the predetermined value at which the oil pressure switch 1 is turned on, the latter 1 is turned on and off, and accordingly the warning lamp 2 is also turned on and off; that is, a so-called "flickering phenomenon" occurs with the warning lamp 2. Thereafter, the circulation pressure may be increased temporarily. In this case, the flickering phenomenon is eliminated; that is, the warning lamp 2 is held turned off again. In this case, it is rather difficult for the operator to determine whether or not the flickering phenomenon intended to inform him of the decrease of the circular pressure.

In the case where the engine is restored after becoming stalled, the circulation pressure is decreased temporarily, and the oil pressure switch 1 is turned on momentarily.

SUMMARY OF THE INVENTION

In view of the foregoing, an object of this invention is to provide an oil pressure alarm device for a motor vehicle in which, even when the oil pressure switch is turned on and off because of the decrease in circulation pressure of the engine oil, the warning lamp is not turned on and off; that is, no flickering phenomenon occurs with the alarm means, whereby a warning is positively given to the operator when the circulation pressure is decreased.

The foregoing object of the invention has been achieved by the provision of an oil pressure alarm device for a motor vehicle which comprises: an oil pressure switch which is turned on when the circulation pressure of engine oil is decreased to a predetermined value; and alarm means for forming a current path in response to the on-off operation of the oil pressure switch after a power switch is turned on, which, according to the invention, further comprises: state detecting means for outputting a detection signal according to the state of rotation of an engine; delay means for outputting an enabling signal a predetermined period of time after the state detecting means outputs the detection signal; and an alarm control circuit which provides a new current path for the alarm means when the oil pressure switch is turned on under the condition that the enabling signal is outputted by the delay means, and maintains the current path while the enabling signal is held outputted, the state detecting means employing as the detection signal the terminal voltage of the field coil assembly of a generator which produces electric power in association with the rotation of the engine, the delay means having canceling means for canceling the terminal voltage of the field coil assembly.

The oil pressure alarm device according to the invention operates as follows: In the case where the engine is not rotated yet although the power switch has been turned on, the circulation pressure of the engine oil is lower than the predetermined value, and therefore the oil pressure switch is held turned on. Accordingly, a current path is formed for the alarm means, so that current is supplied to the alarm means. In this case, the generator produces no electric power, and therefore no detection signal is outputted. However, current flows in the field coil assembly of the generator, and therefore a considerably low terminal voltage is developed by the resistance component of the field coil assembly. Even if the terminal voltage is applied to the delay means, the latter is not activated because it is canceled by the canceling means; that is, the delay means outputs no enabling signal.

When the engine is started, the terminal voltage of the field coil assembly is increased by the output of the generator, so that it is provided as the detection signal. If, in this case, the circulation pressure of the engine oil is normal, or higher than the predetermined value, the oil pressure switch is turned off. When a predetermined period of time passes from the time instant that the detection signal is outputted in this manner, the delay means outputs the enabling signal to enable the alarm control circuit. However, in the case where the oil pressure switch is turned off after chattering itself, the alarm control circuit is not activated because, in this case, the enabling signal has not been outputted yet.

When the oil pressure switch is turned on under the condition that the enabling signal has been outputted, the alarm control circuit provides a new current path for the alarm means, and maintains it while the enabling signal is provided by the delay means. Hence, even in the case where chattering occurs with the oil pressure switch; i.e., the latter is repeatedly turned on and off with the variation in circulation pressure of the engine oil, current is kept applied to the alarm means. Thus, the device positively notifies the operator of the decrease in circulation pressure of the engine oil.

When the engine stops, the generator causes the production of electric power, so that the terminal voltage of the field coil assembly is decreased. Accordingly, no detection signal is applied to the delay means, so that the latter suspends the outputting of the enabling signal, and the alarm control circuit is therefore disabled. As a result, the supply of current to the alarm means depends on the on-off operation of the oil pressure switch. Therefore, the difficulty is eliminated that, in the case where, after the engine is stalled, the operator starts the engine again, the alarm means is still kept energized.

DETAILED DESCRIPTION OF THE PREFERRED EMBODIMENTS

Preferred embodiments of this invention will be described with reference to the accompanying drawings.

Figure 1:
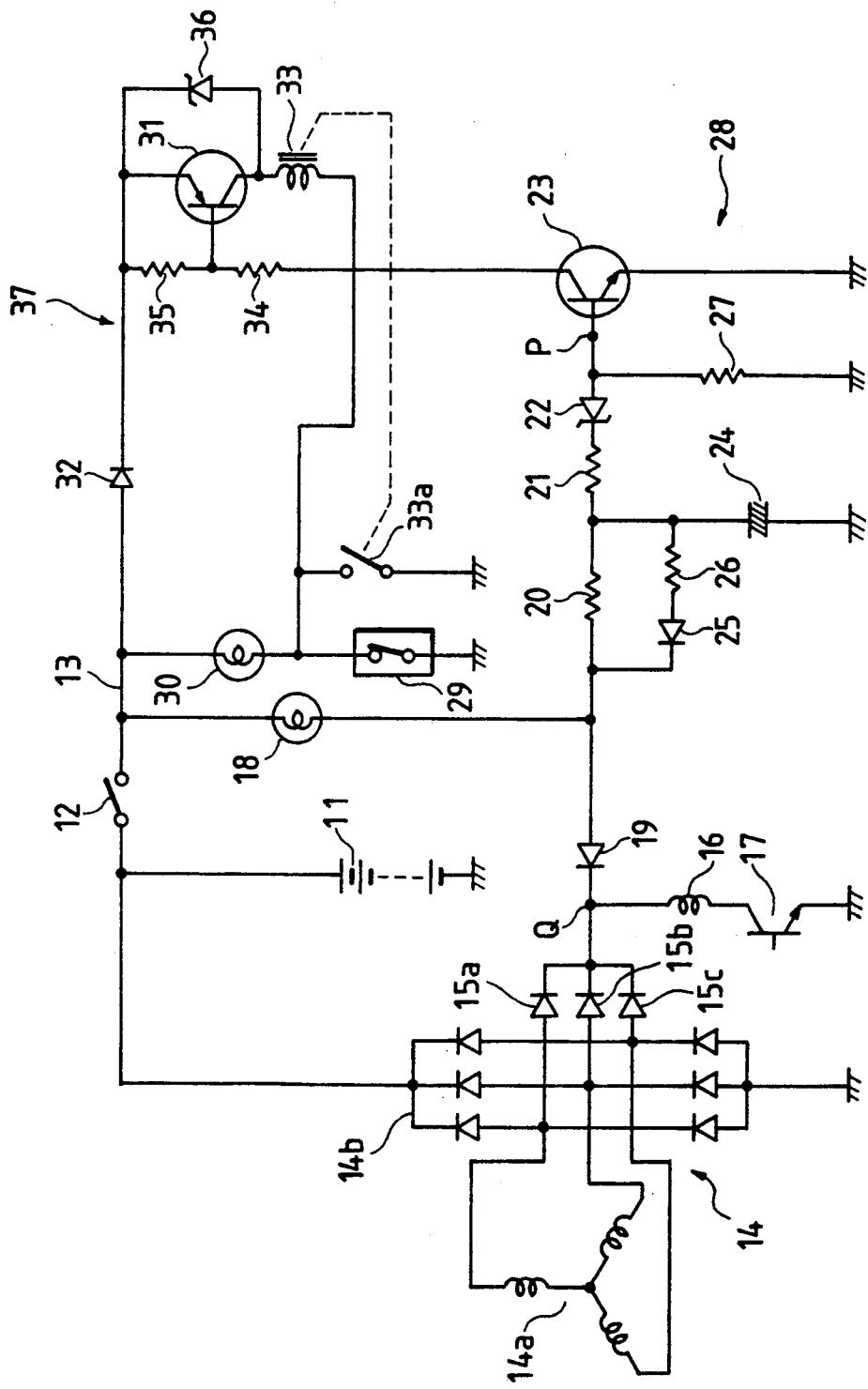
FIG. 1 is a circuit diagram showing an example of an oil pressure alarm device for a motor vehicle which constitutes a first embodiment of the present invention.

FIG. 1 is a circuit diagram showing a first example of an oil pressure alarm device for a motor vehicle, which constitutes a first embodiment of the invention. As shown in FIG. 1, the negative terminal of a vehicle battery 11 is grounded, and the positive terminal is connected to a DC power source line 13 through an ignition switch 12. An alternator 14 is connected across the battery 11, which performs power generation with the rotation of the engine. The alternator 14 serves as state detecting means. In the alternator 14, its stator coil assembly 14a is connected to a rectifier circuit 14b including three-phase-bridge-connected diodes, so that three-phase AC outputs produced by the stator coil assembly 14a are converted into DC outputs. Three output terminals of the stator coil assembly 14a are connected to an output terminal Q respectively, through reverse-current blocking diodes 15a, 15b and 15c. The output terminal Q is grounded through a series circuit of the field coil assembly 16 of the alternator 14 and an npn regular transistor 17. When the engine rotates, the alternator 14 applies an "H" level detection signal to the output terminal Q.

A charge lamp 18 is turned off when the alternator 14 performs power generation. One of the terminals of the charge lamp 18 is connected to the DC power source line 13 and the other terminal is connected to the output terminal Q through a diode 19 (with the polarity as shown in FIG. 1). The connecting point of the charge lamp 18 and the diode 19 is connected to the base of a transistor 23 through a series circuit of resistors 20 and 21 and a Zener diode, as a cancel means, (with the polarity as shown in FIG. 1). The connecting point of the resistors 20 and 21 is grounded through a capacitor 24. The resistor 20 is shunted by a series circuit of a diode 25 (with the polarity as shown in FIG. 1) and a resistor 26. The resistance of the resistor 26 is much lower than that of the resistor 20. The series circuit of the diode 25 and the resistor 26 serves as a discharge circuit. The base of the transistor 23 is grounded through a resistor 27, and the emitter is grounded directly. These circuits form delay means, namely, a delay output circuit 28.

An oil pressure switch 29 is turned off when the circulation pressure of engine oil exceeds a predetermined value. One of the terminals of the oil pressure switch 29 is connected through alarm means, namely, a warning lamp 30, and the other terminal is grounded. The emitter of a latching pnp transistor 31 is connected through a diode 32 (with the polarity as shown in FIG. 1) to the DC power source line 13, and the collector is grounded through a relay coil 33 and a relay contact 33a. The connecting point of the relay coil 33 and the relay contact 33a is connected to the connecting point of the oil pressure switch 29 and the warning lamp 30. The collector of the aforementioned transistor 31 is connected through resistors 34 and 35 to the emitter of the transistor 31. The connecting point of the resistors 34 and 35 is connected to the base of the transistor 31. A Zener diode 36 is connected between the collector and the emitter of the transistor 31 as shown in FIG. 1. Those circuit elements form an alarm control circuit 37.

The operation of the first embodiment thus organized will be described.

(I) Where the ignition switch is held turned on:

When the engine is not started yet although the ignition switch 12 is held turned on, the circulation pressure of the engine oil is lower than the predetermined value. Therefore, the oil pressure switch 29 is held turned on, and the warning lamp 30 is turned on being energized by the vehicle battery 11. The regular transistor 17 is held rendered conductive (on), and the engine is not rotated yet. Hence, the alternator performs no power generation, and no detection signal is provided at the output terminal Q. Thus, a current path is formed; that is, current flows from the battery 11 through the charge lamp 18, the diode 19 and the field coil assembly to the transistor 17, so as to turn on the charge lamp 18.

In this case, the potential at the output terminal Q is not zero (0); that is, the resistance component (for instance about 3 Ω) of the field coil assembly 16 develops a considerably low voltage ΔV at the output terminal Q. Since the voltage ΔV is developed at the output terminal Q as was described above, in the delay output circuit 28 the capacitor 24 is slightly charged; that is, it will have a terminal voltage ΔV. This terminal voltage is canceled out by the Zener diode 22, so that no base voltage is applied to the transistor 23; that is, the transistor 23 is maintained non-conductive (off). Accordingly, in the alarm control circuit 37, the transistor 31 is also maintained non-conductive (off).

(II) At the start of the engine:

When, under this condition, the engine starts, normally the alternator 14 produces electric power, so that an "H" level output is provided at the output terminal Q. As a result, the current flowing from the battery 11 to the charge lamp 18 is interrupted by the diode 19, and the charge lamp 18 is therefore turned off.

On the other hand, since the output terminal Q is raised to "H" level as was described above, the capacitor 24 in the delay output circuit 28 is charged through the resistor 20. In this operation, the charging current flows through the charge lamp 18; however, the latter 18 is not turned on because the resistance of the resistor 20 is high enough (for instance 22 kΩ). When the terminal voltage of the capacitor 24 is increased high enough to drive the transistor 23; that is, when the terminal voltage of the capacitor 24 exceeds the Zener voltage Vz of the Zener diode 22 to apply a base drive voltage to the transistor 23, the latter 23 is rendered conductive (on), and its collector is set to "L" level. This is an "enabling signal outputting state" in this invention. As a result, in the alarm control circuit 37, a drive voltage is applied to the base of the transistor 31 through the resistor 35, so that the transistor 31 is enabled. That is, the transistor 31 is rendered conductive (on) with the voltage applied between the emitter and collector.

Before the alarm control circuit 37 is enabled with the lapse of a predetermined period of time, the oil pressure switch 29 is turned off detecting the fact that the engine oil circulation pressure exceeds the predetermined value, as a result of which the supply of current to the warning lamp 30 is interrupted; that is, the warning lamp 30 is turned off. When the oil pressure switch 29 is turned off, chattering may occur with the latter 29. However, the occurrence of erroneous operations due to the chattering is minimized, because, the alarm control circuit 37 is not enabled for the predetermined period of time with the aid of the delay output circuit 28.

(III) When the oil pressure switch is turned on:

When the circulation pressure of the engine oil is decreased to lower than the predetermined value for instance because the quantity of engine oil is decreased, the oil pressure switch 29 is turned on. As a result, current flows to the warning lamp 30 to turn on the latter 30, while, in the alarm control circuit 37 voltage is applied between the emitter and collector of the transistor 31 through the relay coil 33 to render the transistor 31 conductive (on). When current flows in the relay coil 33, the relay contact means 33a is turned on, thus forming another current path. In addition, when the relay contact means 33a is turned on in this manner, a new current path is formed for the warning lamp 30. As long as the transistor 23 of the delay output circuit 28 is maintained rendered conductive (on), the transistor 31 is also maintained rendered conductive (on), and therefore the relay contact means 33a is held turned on. Thus, the relay coil 33 is maintained self-held. That is, even if the oil pressure switch 29 is turned on and off thereafter, the warning lamp 30 is maintained turned on irrespective of the on-off operation of the oil pressure switch. Hence, even if chattering occurs with the oil pressure switch 29, the warning lamp 30 will never flicker. Thus, when the circulation pressure of the engine oil decreases, a warning is positively given to the operator.

(IV) When the engine is stalled:

When the engine, being stalled for instance, is stopped while the warning operation is being carried out by the alarm control circuit 37, the alternator will apply no detection signal to the output terminal Q. Hence, current flows in the charge lamp 18 to turn on the latter 18, while, the capacitor 24 of the delay output circuit 28 is quickly discharged through the resistor 26 and the diode 25 on the side of the output terminal Q. As a result, the transistor 23 of the delay output circuit 28 is quickly rendered non-conductive, and accordingly the transistor 31 of the alarm control circuit 37 is also rendered non-conductive. Therefore, the relay coil 33 is deenergized; that is, it is no longer self-held, as a result of which the relay contact means 33a is turned off, and the current path for the warning lamp 30 is discontinued.

On the other hand, since the circulation pressure is decreased because of the stop of the engine, the oil pressure switch 29 is turned on, and therefore the current path for the warning lamp 30 is completed through the oil pressure switch 29. Thus, the warning lamp 30 is turned on similarly as in the above-described case where the engine is not started yet. After the engine stops, the operator may start the engine immediately. In this case, the relay contact means 33a has been turned off by the alarm control circuit 37. Therefore, the starting operation can be performed all over again. Thus, the device is convenient for the operator.

In the above-described embodiment, the detection signal from the alternator 14 is detected as the terminal voltage of the field coil assembly 16 to prevent the chattering of the oil pressure switch 29. When the alternator 14 provides no detection signal, the terminal voltage of the field coil assembly 16 is not zero (0); that is, the voltage $\Delta V$ corresponding to the resistance of the field coil assembly 16 is provided at the output terminal Q. However, the voltage $\Delta V$ will not render the transistor 23 conductive, because it is canceled by the Zener diode 22. That is, the erroneous operation is prevented.

(V) Where the engine is restored after being stalled:

Sometimes the engine operates as follows; First the engine is stalled, not stopped, with the number of revolution being decreased, and thereafter it is restored to operate normally. In this case, the alarm control circuit 37 is temporarily disabled as follows:

When the number of revolution of the engine is decreased because the engine is being stalled, the output of the alternator is decreased, and the potential at the output terminal Q is decreased. Therefore, the capacitor 24 is discharged through the resistor 26, the diodes 25 and 19, the field coil assembly 16 and the transistor 17, as a result of which the terminal voltage of the capacitor 24 is decreased. The Zener voltage Vz of the Zener diode 22 is set to a relatively large value, about 7 V. Therefore, if the terminal voltage of the capacitor 24 is decreased even slightly, the base drive voltage of the transistor 23 becomes insufficient, so that the transistor 23 is rendered non-conductive, and the outputting of the enabling signal is suspended. Accordingly, the transistor 31 in the alarm control circuit 37 is turned off, so that the alarm control circuit 37 is disabled. Even if the quantity of engine oil is normal, sometimes the oil pressure switch 29 is turned on as the engine is decreased in the number of revolution. In this connection, the Zener voltage Vz is determined. More specifically, the Zener voltage Vz is so determined that the above-described operation is carried out before the oil pressure switch is turned on in this manner.

Figure 2:
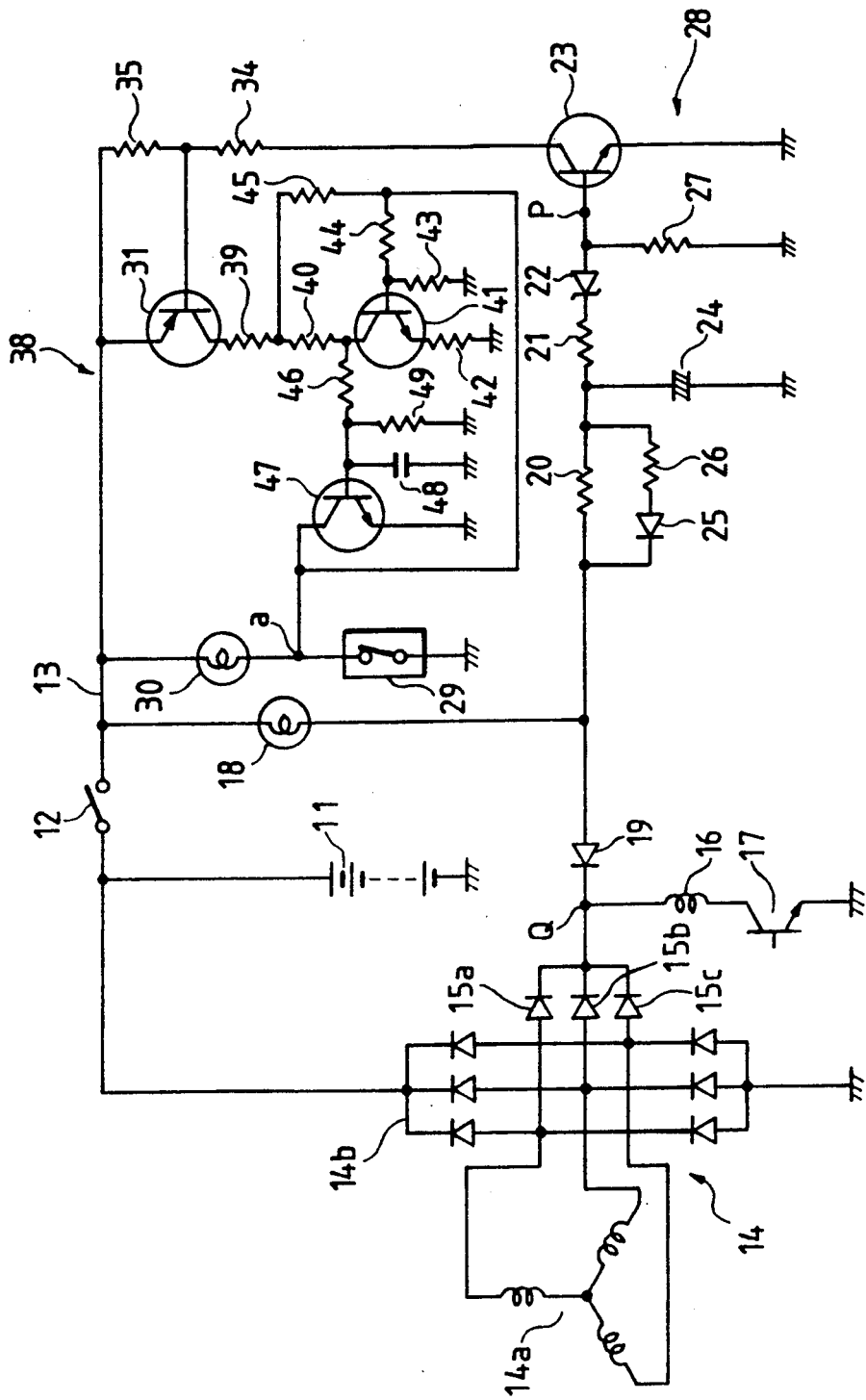
FIGS. 2 through 5 are circuit diagrams showing other examples of the oil pressure alarm device which constitute second, third, fourth and fifth embodiments of the present invention, respectively.

FIG. 2 shows an another example of the oil pressure alarm device, which constitutes a second embodiment of the invention. The second embodiment is different from the above-described first embodiment in that, instead of the alarm control circuit 37, an alarm control circuit 38 is employed. Therefore, only parts in which the second embodiment is different from the first embodiment will be described.

That is, the alarm control circuit 38 is organized as shown in FIG. 2. The collector of a transistor 31 is grounded through resistors 39 and 40, an npn transistor 41 and a resistor 42. The base of the transistor 41 is grounded through a resistor 43, and is connected through resistors 44 and 45 to the connecting point of the resistors 39 and 40. The collector of the transistor 41 is connected through a resistor 46 to the base of an npn transistor 47, the emitter of which is grounded. The base of the transistor 47 is grounded through a parallel circuit of a capacitor 48 and a resistor 49. The collector of the transistor 47 is connected to a detection terminal a which is the common connecting point of the warning lamp 30 and the oil pressure switch 29, and to the common connecting point of the resistors 44 and 45.

Now, the operation of the oil pressure alarm device, the second embodiment, will be described.

(I) Where the ignition switch is turned on:

In the case where, although the ignition switch has been turned on, the engine is not started yet, the circulation pressure of the engine oil is lower than the predetermined value. Hence, the oil pressure switch 29 is turned on, and accordingly current flows from the battery 11 to the warning lamp 30 to turn on the latter 30.

On the other hand, the regular transistor 17 is rendered conductive (on), and the alternator 14 produces no electric power because the engine is not rotated. Thus, no detection signal is applied to the output terminal Q yet. As a result, a current path is completed which is extended from the battery 11 through the charge lamp 18, the diode 19, and the field coil assembly 16 to the transistor 17, so that the charge lamp 18 is turned on.

In this case, the potential at the output terminal Q is not zero (0); that is, a considerably low voltage ΔV due to the resistance component (for instance about 3 Ω) is developed at the output terminal Q. However, similarly as in the above-described first embodiment, the voltage ΔV is canceled by the Zener diode 22, and therefore the delay output circuit 28 outputs no enabling signal.

(II) At the start of the engine:

When, under this condition, the engine is started, normally an "H" level output is provided at the output terminal Q because the alternator 14 performs power generation. As a result, the supply of current from the battery 11 to the charge lamp 18 is interrupted by the diode 19, so that the charge lamp 18 is turned off.

On the other hand, when the output terminal Q is raised to "H" level in the above-described manner, in the delay output circuit 28 the capacitor 24 is charged through the resistor 20. In this operation, the charging current flows in the charge lamp 18; however, it cannot turn on the latter 18 because the resistance of the resistor 20 is considerably high (for instance 22 kΩ). When the circulation pressure of the engine oil is increased to exceed the predetermined value as the engine rotates, the oil pressure switch 29 is turned off, and the supply of current to the warning lamp 30 is interrupted; that is, the warning lamp 30 is turned off. In this case, the detection terminal a is raised to "H" level from "L" level, and base voltages are applied to the transistors 41 and 47. In this case, in the transistor 47, the base voltage does not reach the drive voltage until the capacitor 48 is charged up. Accordingly, the transistor 41 is rendered conductive (on) earlier than the transistor 47. When the transistor 41 is conductive (on), its collector current flows through the resistors 45 and 40, thus being unable to turn on the warning lamp 30. In addition, when the transistor 41 is rendered conductive (on), the collector is set to "L" level. As a result, the capacitor 48 is discharged, and therefore no drive voltage is provided for the base of the transistor 47, so that the latter 47 is rendered non-conductive. Hence, even in the case where the oil pressure switch 29 is turned off while chattering, the warning lamp 30 is not turned on. When, under this condition, a predetermined period of time passes, in the delay output circuit 28, the terminal voltage of the capacitor 24 is applied, as a drive voltage, to the base of the transistor 23, so that the latter 23 is rendered conductive (on). As a result, the terminal voltage of the resistor 35 is applied, as a drive voltage, to the base of the transistor 31, so that the latter 31 is turned on. In this case, the transistor 41 is conductive as was described above, and it is maintained conductive even when the transistor 31 is turned on.

(III) When the oil pressure switch is turned on:

When, under this condition, the circulation pressure of the engine oil is decreased to lower than the predetermined value for instance because the quantity of engine oil decreases, the oil pressure switch 29 is turned on, so that the detection terminal a is set to "L" level, and the warning lamp 30 is turned on. As a result, in the alarm control circuit 38, the base of the transistor 41 is set to "L" level through the resistor 44, so that the latter 44 is rendered non-conductive (off). and the collector is raised to "H" level. As a result, a drive voltage is applied to the base of the transistor 47 through the resistors 46 and 49, so that the transistor 47 is rendered conductive (on), thus providing a new current path for the warning lamp 30. This condition is maintained irrespective to the on-off operation of the oil pressure switch 29; more specifically, the condition is maintained unchanged as long as the transistors 31 and 23 are conductive (on); that is, as long as the engine rotates. The warning lamp 30 is therefore maintained turned on. Hence, even when chattering occurs with the oil pressure switch 29, the warning lamp 30 will not flicker. Thus, the device can positively inform the operator of the decrease in circulation pressure of the engine oil.

(IV) When the engine is stalled:

When the engine, being stalled for instance, is stopped during the alarm operation of the alarm control circuit 38, the alternator 14 applies no detection signal to the output terminal Q. Therefore, current is applied to the charge lamp 18 to turn on the latter 18, while the capacitor 24 of the delay output circuit 28 is quickly discharged through the resistor 26 and the diode 25. As a result, the transistor 23 of the delay output circuit 28 is rendered non-conductive (off), and accordingly the transistor 31 of the alarm control circuit 38 is also rendered non-conductive (off). As a result, no drive voltage is applied to the base of the transistor 47, so that the latter 47 is rendered non-conductive (off), and the supply of current to the warning lamp 30 is interrupted. On the other hand, as the engine stops, the engine oil circulation pressure is decreased, so that the oil pressure switch 29 is turned on. As a result, the current path for the warning lamp 30 is completed through the oil pressure switch 29. Thus, the warning lamp 30 is turned on similarly as in the above-described case where the engine is not started yet. After the engine stops, the operator may start the engine immediately. In this case, the transistor 47 has been rendered non-conductive, and therefore the starting operation can be performed all over again. Thus, the device is convenient for the operator.

Thus, the second embodiment has the same effects or merits as the first embodiment.

Figure 3:
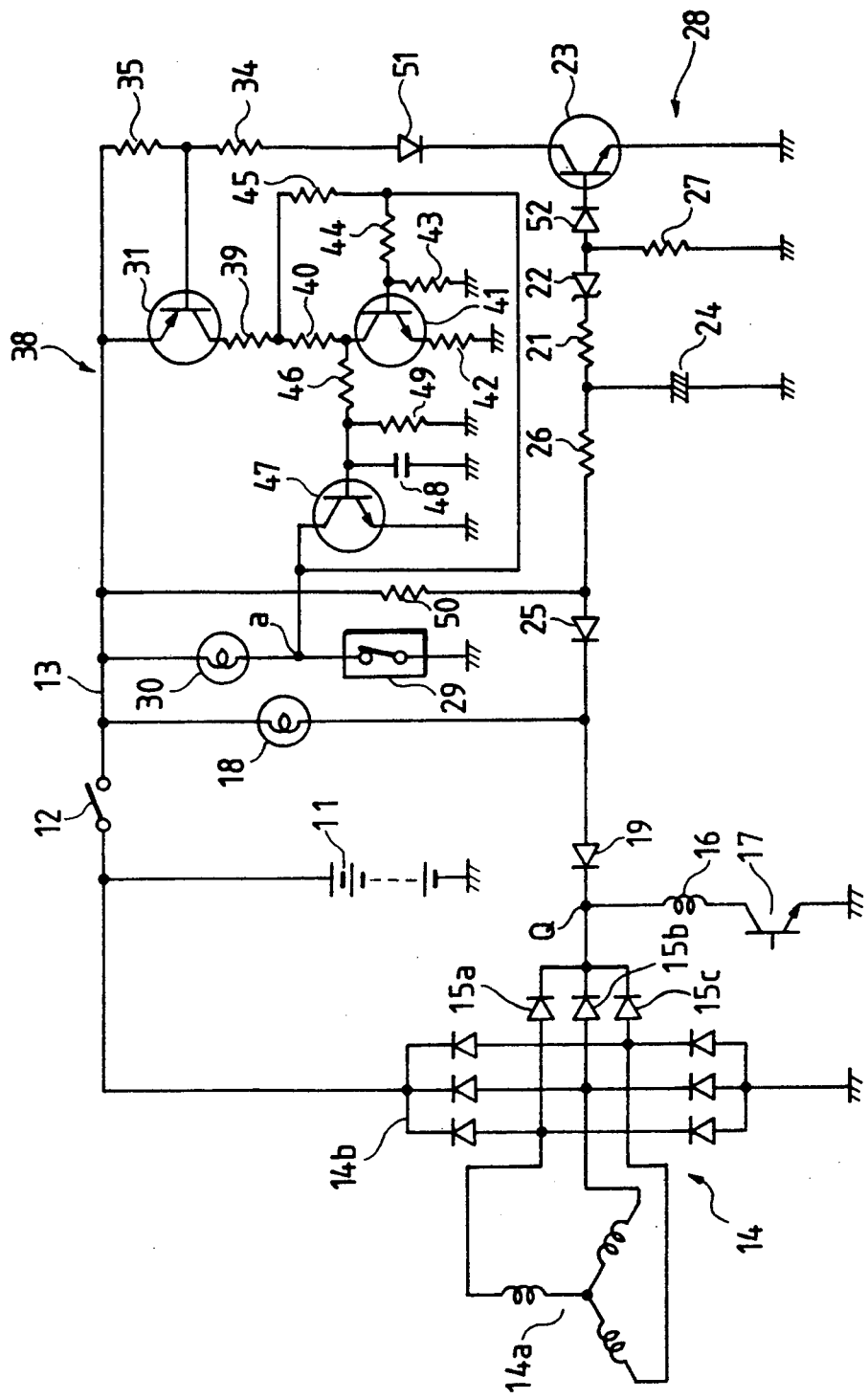

FIG. 3 shows another example of the oil pressure alarm device, which constitutes a third embodiment of the invention. The third embodiment is different from the second embodiment in that the resistor 20 is eliminated, and instead a resistor 50 is connected between the common connecting point of the diode 25 and the resistor 26 and the DC power source line 13. In the third embodiment, reverse-current blocking diodes 51 and 52 are connected to the collector and the base of the transistor 23, respectively, with the polarity as shown in FIG. 3.

In the third embodiment, when the alternator 14 applies the detection output to the output terminal Q after the start of the engine, the capacitor 24 of the delay output circuit 28 is charged through the resistors 50 and 26. Thus, the third embodiment operates in the same manner as the second embodiment, providing the same effects. Furthermore, in the third embodiment, the capacitor 24 is smoothly charged even for instance when the charge lamp 18 becomes out of order.

Figure 4:
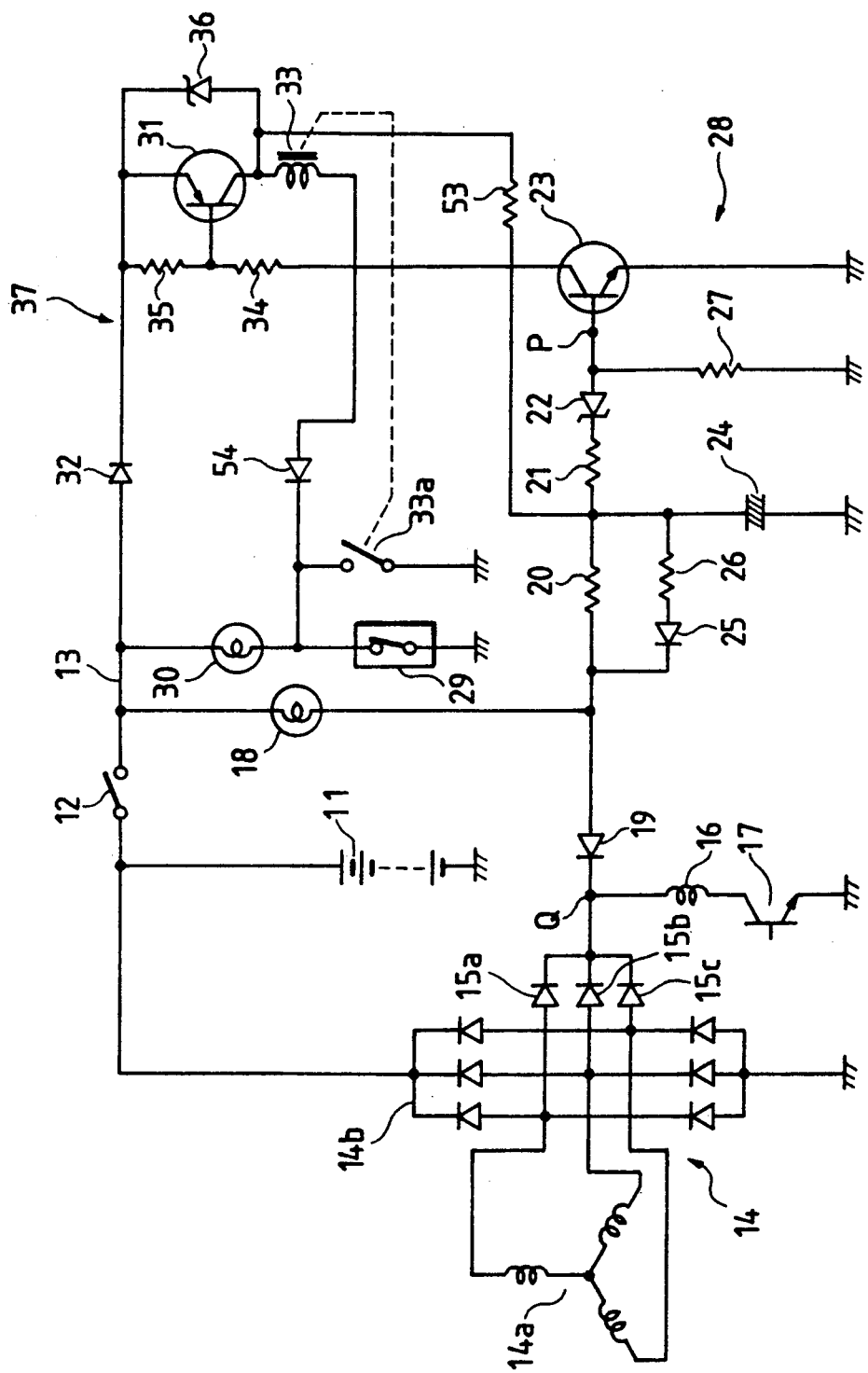

FIG. 4 shows another example of the oil pressure alarm device, which constitutes a fourth embodiment of the invention. The fourth embodiment can be obtained by adding the following functions to the first embodiment. Therefore, only the functions will be described. The fourth embodiment is different from the first embodiment in that a resistor 53 is connected between the common connecting point of the resistors and 21 and the collector of the transistor 31, and a diode is connected between the relay coil 33 and the relay contact means 33a (with the polarity as shown in FIG. 4). In the embodiment, the resistors 53 and 20 are for instance 3 kΩ, and 22 kΩ, respectively, and the resistance component of the relay coil 33 is for instance about 300 Ω.

The fourth embodiment thus organized operates as follows:

(I) Where the ignition switch is turned on:

The operation is substantially equal to that of the first embodiment which is carried out under the condition the ignition switch has been turned on.

(II) At the start of the engine:

When, under this condition, the engine is started, normally an "H" level output is provided at the output terminal Q because the alternator 14 performs power generation. As a result, the supply of current from the battery 11 to the charge lamp 18 is interrupted by the diode 19, so that the charge lamp 18 is turned off.

In the case where the oil pressure switch 29 is turned off when the engine is started, the warning lamp 30 is turned off. And similarly as in the first embodiment, the delay output circuit 28 operates, to enable the alarm control circuit 37.

In the case where, on the other hand, the oil pressure switch 29 is maintained turned on after the start of the engine, the warning lamp 30 is also maintained turned on because the oil pressure switch 29 is maintained turned on as was described above. In this case, current is supplies to the delay output circuit 28 through the current path which extends from the charge lamp 18 through the resistors 20 and 54, the relay coil 33 and the diode 53 to the oil pressure switch 29. However, the capacitor 24 is charged to a low voltage, about 1.5 V, because of the voltage division by the resistors 20 and 3; that is, the terminal voltage of the capacitor applied through the Zener diode 22 to the base of the transistor 23 is not high enough to render the transistor 23 conductive. In addition, the current itself is small, and therefore the charge lamp 18 is not turned on, and the relay coil 33 is not activated, so that the relay contact means 33a is maintained turned off. When the oil pressure switch 29 is thereafter turned off, the terminal voltage of the capacitor 24 is increased; that is, the capacitor is charged. Thus, similarly as in the above-described case, the alarm control circuit 37 is enabled. When the transistor 31 is turned on, the base current is applied to the transistor 23 through the resistor 53. The transistors 23 and 31 are maintained rendered conductive (on) irrespective of the variations in supply voltage because the resistance of the resistor 53 is much lower than that of the resistor 20.

(III) When the oil pressure switch is turned on:

When the circulation pressure of the engine oil is decreased to lower than the predetermined value for instance because the quantity of engine oil decreases, the oil pressure switch 29 is turned on. Thereafter, the fourth embodiment operates in the same manner as the first embodiment, and the warning lamp 30 is maintained turned on. Hence, even when chattering occurs with the oil pressure switch 29, the warning lamp 30 will not flicker. Thus, the device positively notifies the operator of the decrease in circulation pressure of the engine oil.

(IV) When the engine is stalled:

When the engine, being stalled for instance, is stopped during the alarm operation of the alarm control circuit 37 or while the alarm control circuit 37 is enabled, the alternator 14 applies no detection signal to the output terminal Q. Therefore, current is applied to the charge lamp 18 to turn on the latter 18, while the capacitor 24 of the delay output circuit 28 is quickly discharged through the resistor 26 and the diode 25. As a result, the transistor 23 of the delay output circuit 28 is rendered non-conductive (off), and accordingly the transistor 31 of the alarm control circuit 37 is also rendered non-conductive (off). As a result, the relay coil 33 is deenergized, and it is no longer self-held, so that the supply of current to the warning lamp 30 is interrupted. On the other hand, as the engine stops, the engine oil circulation pressure is decreased, so that the oil pressure switch 29 is turned on. As a result, the current path for the warning lamp 30 is completed through the oil pressure switch 29. Thus, the warning lamp 30 is turned on similarly as in the above-described case where the engine is not started yet. After the engine stops, the operator may start the engine immediately. In this case, the relay coil 33 has been deenergized, and therefore the starting operation can be performed all over again. Thus, the device is convenient for the operator.

(V) Where the engine is restored after being stalled:

Sometimes the engine operates as follows; First the engine is stalled, not stopped, with the speed of rotation being decreased, and thereafter it is restored to operate normally. In this case, the alarm control circuit 37 is temporarily disabled as follows:

When the speed of rotation of the engine is decreased because the engine is being stalled, the output of the alternator 14 is decreased, and the potential at the output terminal is decreased. Therefore, the capacitor 24 is discharged through the resistor 26, the diodes 25 and 19, the field coil assembly 16 and the transistor 17, as a result of which the terminal voltage of the capacitor 24 is decreased. The Zener voltage Vz of the Zener diode 22 is set to a relatively large value, about 7V. Therefore, if the terminal voltage of the capacitor 24 is decreased even slightly, the base drive voltage of the transistor 23 becomes insufficient, so that the transistor 23 is rendered non-conductive and the outputting of the enabling signal is suspended. Accordingly, the transistor 31 in the alarm control circuit 37 is turned off, so that the alarm control circuit 37 is disabled. Even if the quantity of engine oil is normal, sometimes the oil pressure switch 29 is turned on when the engine is decreased in the speed of rotation. In this connection, the Zener voltage Vz is determined. More specifically, the Zener voltage Vz is so determined that the above-described operation is carried out before the oil pressure switch is turned on in this manner.

In the fourth embodiment thus designed, the delay output circuit 28 is not started until the oil pressure switch 29 is turned off at the start of the engine. Therefore, even if the oil pressure switch 29 is turned off with delay, the difficulty is eliminated that the delay output circuit is erroneously kept energized. Thus, the operator can utilize the device more effectively.

Figure 5:
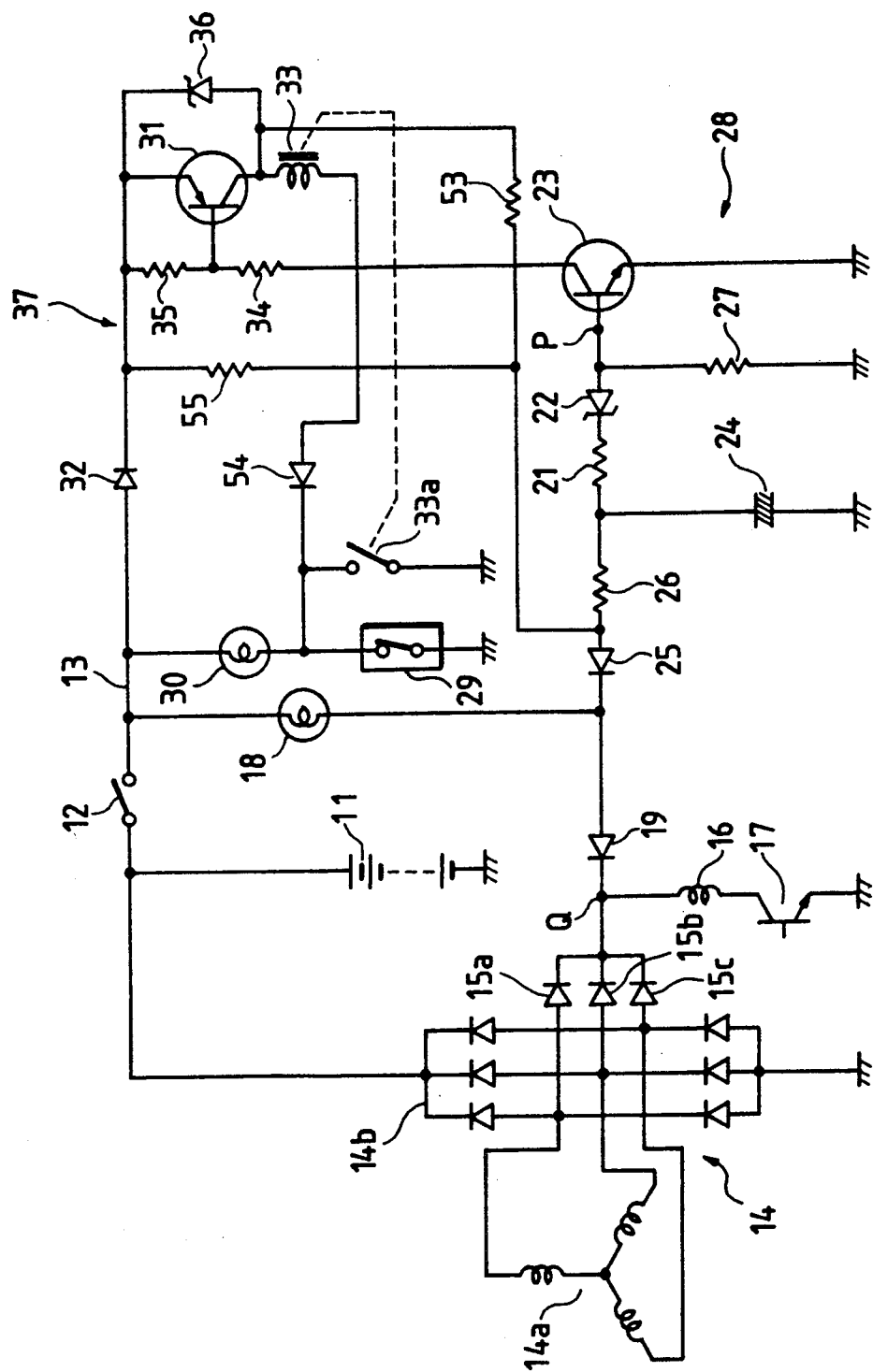
Figure 6:
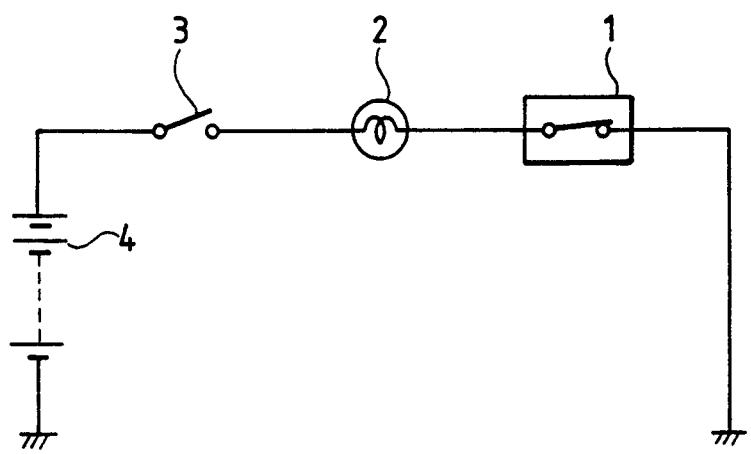
FIG. 6 is a circuit diagram showing a conventional oil pressure alarm device.

FIG. 5 shows another example of the oil pressure alarm device, a fifth embodiment of the invention. The fifth embodiment is different from the fourth embodiment in that the resistor 20 is eliminated, and instead a resistor 55 is connected between the common connecting point of the diode 25 and the resistor 26 and the DC power source line 13.

The fifth embodiment has the same effects as the third or fourth embodiment.

In the above-described embodiments, the canceling means is the Zener diode 22; however, the invention is not limited thereto or thereby. For instance, a diode may be provided at the point P in each of FIGS. 1, 2, 4 and 5 in such a manner that it is forward in polarity with respect to the transistor 23.

Further in the above-described embodiments, the delay means is the delay output circuit 28 using the capacitor 24; however, the invention is not limited thereto or thereby. For instant, it may be replaced with a timer circuit for providing a delay time. That is, various changes and modifications may be made in the above-described embodiments without departing from the invention.

As was described above, in the oil pressure alarm device of the invention, the state detecting means outputs the detection signal after the rotation of the engine is started, and the delay means applies the enabling signal to the alarm control circuit when the predetermined period of time passes from the time instant that the detection signal is outputted in this manner. Current is applied to the alarm means when the oil pressure switch is turned on under the condition that the enabling signal is outputted by the delay means, and the supply of current to the alarm means is maintained while the enabling signal is applied to the alarm control circuit. Hence, even when chattering occurs with the oil pressure switch because the engine oil is decreased in circulation pressure during the rotation of the engine, the alarm means will never flicker. Thus, the device can inform the operator of the decrease in circulation pressure of the engine oil.

Furthermore, in the device, the detection signal provided by the state detecting means is based on the terminal voltage of the field coil assembly in the electric generator, and the canceling means cancels the terminal voltage which is developed across the field coil assembly when the engine stops. Therefore, the difficulty is eliminated that the delay means outputs the enabling signal by error. These effects should be highly appreciated.

What is claimed is:

1. An oil pressure alarm device for an engine of a motor vehicle comprising:

an oil pressure switch, said oil pressure switch being activated to a conductive state when the circulation oil pressure of engine oil decreases below a predetermined level;

alarm means for forming a first current path in response to a conductive and nonconductive operation of said oil pressure switch after a main power switch is turned on;

state detecting means including an alternator having an output terminal which is grounded through a series circuit of a field coil assembly of said alternator and an NPN transistor, for producing a detection signal in response to rotation of said engine;

delay means for producing an enabling signal after a predetermined period of time has elapsed from when said detection signal is supplied from said state detecting means, including cancel means for cancelling said terminal voltage of said field coil assembly when said engine is stopped; and alarm control means for forming a second current path for said alarm means when said oil pressure switch is turned on under the condition that said enabling signal is outputted by said delay means, and for maintaining said second current path while said enabling is supplied from said delay means to said warning control circuit.

2. An oil pressure device as claimed in claim 1, wherein said state detecting signal means employs said detection signal as said terminal voltage of the field coil assembly of said alternator which produces electronic power in association with the rotation of said engine.

3. An oil pressure device as claimed in claim 1, wherein said cancel means includes a Zener diode, a cathode of which being connected to said field coil.

* * * * *

UNITED STATES PATENT AND TRADEMARK OFFICE
CERTIFICATE OF CORRECTION

PATENT NO. : 5,229,745
DATED : July 20, 1993
INVENTOR(S) : Masayuki Koide et al.

It is certified that error appears in the above-indentified patent and that said Letters Patent is hereby corrected as shown below:

Claim 3, column 12, line 41, change "being" to --is--

Signed and Sealed this

Third Day of May, 1994

Attest:

BRUCE LEHMAN

Attesting Officer      Commissioner of Patents and Trademarks